US010928849B2

(12) United States Patent
Jeon et al.

(10) Patent No.: US 10,928,849 B2
(45) Date of Patent: Feb. 23, 2021

(54) SEMICONDUCTOR DEVICE, SEMICONDUCTOR SYSTEM AND METHOD FOR OPERATING SEMICONDUCTOR DEVICE

(71) Applicant: SAMSUNG ELECTRONICS CO., LTD., Suwon-si (KR)

(72) Inventors: Ho Yeon Jeon, Hwaseong-si (KR); Ah Chan Kim, Hwaseong-si (KR); Jae Gon Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 12 days.

(21) Appl. No.: 16/393,106

(22) Filed: Apr. 24, 2019

(65) Prior Publication Data

US 2019/0250659 A1    Aug. 15, 2019

Related U.S. Application Data

(63) Continuation of application No. 15/414,819, filed on Jan. 25, 2017, now Pat. No. 10,303,203.

(Continued)

(30) Foreign Application Priority Data

Jan. 3, 2017  (KR) .................. 10-2017-0000609
Jan. 24, 2017 (KR) .................. 10-2017-0010945

(51) Int. Cl.
*G06F 1/10* (2006.01)
*G06F 1/32* (2019.01)
*G06F 1/3237* (2019.01)

(52) U.S. Cl.
CPC .............. *G06F 1/10* (2013.01); *G06F 1/3237* (2013.01)

(58) Field of Classification Search
CPC .................. G06F 1/10; G06F 1/3237
See application file for complete search history.

(56) References Cited

U.S. PATENT DOCUMENTS 5,373,293 A    12/1994 Hirata
5,600,839 A    2/1997 MacDonald
(Continued)

FOREIGN PATENT DOCUMENTS

JP    11-143570     5/1999
JP    2007-065756   3/2007
(Continued)

OTHER PUBLICATIONS

Office Action dated Aug. 25, 2018 Corresponding to. U.S. Appl. No. 15/414,819.

(Continued)

*Primary Examiner* — Stefan Stoynov
(74) *Attorney, Agent, or Firm* — F. Chau & Associates, LLC

(57) ABSTRACT

A semiconductor device includes a first control circuit controlling a first child clock source to receive a clock signal from a parent clock source, a first channel management (CM) circuit transmitting a first clock request to the first control circuit in response to a second clock request received from a first IP block, a second control circuit controlling a second child clock source to receive the clock signal from the parent clock source, a second CM circuit transmitting a third clock request to the second control circuit in response to a fourth clock request received from a second IP block, and a power management unit transmitting a power control command to the first CM circuit and the second CM circuit to control a power state of the first IP block and the second IP block. The first CM circuit and the second exchange signals to maintain a master-slave relationship.

20 Claims, 17 Drawing Sheets

Related U.S. Application Data

(60) Provisional application No. 62/286,882, filed on Jan. 25, 2016, provisional application No. 62/286,860, filed on Jan. 25, 2016.

(56) References Cited

U.S. PATENT DOCUMENTS

| | | | |
|---|---|---|---|
| 5,655,127 | A | 8/1997 | Rabe et al. |
| 5,661,751 | A | 8/1997 | Johnson |
| 5,793,993 | A | 8/1998 | Broedner et al. |
| 5,978,930 | A | 11/1999 | Furuta et al. |
| 6,021,501 | A | 2/2000 | Shay |
| 6,073,244 | A * | 6/2000 | Iwazaki ............... G06F 1/08 713/322 |
| 6,437,617 | B2 | 8/2002 | Saeki |
| 6,654,898 | B1 | 11/2003 | Bailey et al. |
| 6,822,481 | B1 | 11/2004 | Srikantam et al. |
| 6,889,331 | B2 | 5/2005 | Soerensen et al. |
| 6,915,438 | B2 | 7/2005 | Boros |
| 6,927,604 | B2 | 8/2005 | Boerstler et al. |
| 7,111,183 | B1 | 9/2006 | Klein et al. |
| 7,142,478 | B2 | 11/2006 | Suh |
| 7,162,556 | B2 | 1/2007 | Fujiki |
| 7,174,467 | B1 | 2/2007 | Helms et al. |
| 7,245,161 | B2 | 7/2007 | Boerstler et al. |
| 7,443,218 | B2 | 10/2008 | Onouchi et al. |
| 7,694,042 | B2 | 4/2010 | Lee et al. |
| 7,797,561 | B1 | 9/2010 | Abdalla et al. |
| 7,813,908 | B2 | 10/2010 | Yen et al. |
| 7,971,086 | B2 | 6/2011 | Itkin |
| 8,086,975 | B2 | 12/2011 | Shiring et al. |
| 8,112,648 | B2 * | 2/2012 | Branover ............... G06F 9/5027 713/320 |
| 8,132,144 | B2 | 3/2012 | Sundaresan et al. |
| 8,140,925 | B2 | 3/2012 | Bellofatto et al. |
| 8,289,048 | B2 | 10/2012 | Cressman |
| 8,291,244 | B2 | 10/2012 | Tune |
| 8,375,239 | B2 | 2/2013 | Nara et al. |
| 8,533,648 | B2 | 9/2013 | Sundaresan et al. |
| 8,572,418 | B2 | 10/2013 | Singasan |
| 8,656,196 | B2 | 2/2014 | de Cesare et al. |
| 8,826,047 | B1 | 9/2014 | Zhu et al. |
| 8,898,502 | B2 | 11/2014 | Maddigan et al. |
| 8,924,612 | B2 | 12/2014 | Maji et al. |
| 8,996,906 | B1 | 3/2015 | Townley et al. |
| 9,081,517 | B2 | 7/2015 | Koniaris et al. |
| 9,152,598 | B2 | 10/2015 | Fosse et al. |
| 9,172,377 | B2 | 10/2015 | Peng |
| 9,383,805 | B2 | 7/2016 | Jouin et al. |
| 9,766,648 | B2 | 9/2017 | Hashim et al. |
| 2002/0152407 | A1 | 10/2002 | Alia et al. |
| 2003/0117176 | A1 | 6/2003 | Tardieux et al. |
| 2004/0153678 | A1 | 8/2004 | Ahmad et al. |
| 2004/0243874 | A1 | 12/2004 | Byers et al. |
| 2005/0232218 | A1 | 10/2005 | Edwards et al. |
| 2006/0161797 | A1 | 7/2006 | Grass et al. |
| 2006/0248367 | A1 | 11/2006 | Fischer et al. |
| 2008/0178024 | A1 | 7/2008 | Kamegawa |
| 2008/0301604 | A1 | 12/2008 | Itskovich et al. |
| 2009/0150706 | A1 | 6/2009 | Oh et al. |
| 2011/0050300 | A1 | 3/2011 | Klapproth et al. |
| 2011/0202788 | A1 | 8/2011 | Hesse et al. |
| 2011/0239021 | A1 | 9/2011 | Vedder et al. |
| 2012/0131370 | A1 | 5/2012 | Wang et al. |
| 2013/0055004 | A1 | 2/2013 | Koniaris et al. |
| 2013/0124895 | A1 | 5/2013 | Saha et al. |
| 2013/0173951 | A1 | 7/2013 | Vogel |
| 2014/0082396 | A1 | 3/2014 | Vahidsafa et al. |
| 2014/0089697 | A1 | 3/2014 | Kim et al. |
| 2014/0266333 | A1 | 9/2014 | Jouin et al. |
| 2015/0200669 | A1 | 7/2015 | Cai et al. |
| 2015/0373313 | A1 | 12/2015 | Kinebuchi et al. |
| 2016/0094337 | A1 | 3/2016 | Choi et al. |
| 2016/0116934 | A1 | 4/2016 | Ha |
| 2016/0350259 | A1 | 12/2016 | Jeon et al. |
| 2017/0212567 | A1 | 7/2017 | Jeon et al. |

FOREIGN PATENT DOCUMENTS

| | | |
|---|---|---|
| JP | 2008-097594 | 4/2008 |
| JP | 2010-021793 | 1/2010 |
| JP | 5678849 | 3/2015 |
| KR | 1020060064146 | 6/2006 |
| KR | 10-0852885 | 8/2008 |
| KR | 10-1184182 | 9/2012 |
| KR | 1020160038671 | 4/2016 |
| KR | 10-2016-0138786 | 12/2016 |

OTHER PUBLICATIONS

U.S. Notice of Allowance dated May 22, 2019 in Related U.S. Appl. No. 15/415,020.
U.S. OA dated Jul. 5, 2018 in Related U.S. Appl. No. 15/415,041.
U.S. OA dated Jul. 9, 2018 in Related U.S. Appl. No. 15/414,969.
U.S. NOA dated Sep. 17, 2018 in Related U.S. Appl. No. 15/415,162.
U.S. OA dated Oct. 4, 2018 in Related U.S. Appl. No. 15/415,020.

* cited by examiner

1200

1300

1400

SEMICONDUCTOR DEVICE, SEMICONDUCTOR SYSTEM AND METHOD FOR OPERATING SEMICONDUCTOR DEVICE

CROSS-REFERENCE TO RELATED APPLICATIONS

This application is a continuation of U.S. application Ser. No. 15/414,819 filed Jan. 25, 2017 and issued as U.S. Pat. No. 10,303,203 on May 28, 2019, which claims priority to U.S. Provisional Patent Application No. 62/286,882 filed on Jan. 25, 2016 in the United States Patent and Trademark Office, U.S. Provisional Patent Application No. 62/286,860 filed on Jan. 25, 2016 in the United States Patent and Trademark Office, Korean Patent Application No. 10-2017-0010945 filed on Jan. 24, 2017 in the Korean Intellectual Property Office, and Korean Patent Application No. 10-2017-0000609 filed on Jan. 3, 2017 in the Korean Intellectual Property Office, the disclosures of each is incorporated by reference in their entireties.

BACKGROUND

1. Technical Field

The present disclosure relates to a semiconductor device, a semiconductor system, and a method for operating a semiconductor device.

2. Discussion of Related Art

A System-on-Chip (SOC) may include one or more intellectual property blocks (IP blocks), a clock management unit (CMU), and a power management unit (PMU). The clock management unit provides a clock signal to one or more of the IP blocks. Further, the clock management unit stops providing the clock signal to the IP block that is not executing, thereby making it possible to reduce the unnecessary waste of resources in a system employing the SoC.

SUMMARY

At least one exemplar embodiment of the present inventive concept provides a semiconductor device for executing power management using a master-slave relationship where a clock signal control is managed by hardware.

At least one embodiment of the present inventive concept provides a semiconductor system for executing power management using a master-slave relationship where a clock signal control is managed by hardware.

At least one embodiment of the present inventive concept provides a method of operating a semiconductor device for executing power management using a master-slave relationship where a clock signal control is managed by hardware.

According to an exemplary embodiment of the present inventive concept, a semiconductor device includes a first clock control circuit, a first channel management circuit, a second clock control circuit, a second channel management circuit, and power management unit (PMU). The PMU may be implemented by a circuit. The first clock control circuit controls a first child clock source to receive a clock signal from a parent clock source. The first channel management circuit transmits a first clock request to the first clock control circuit in response to a first intellectual property (IP) block clock request received from a first IP block. The second clock control circuit controls a second child clock source to receive the clock signal from the parent clock source. The second channel management circuit transmits a second clock request to the second clock control circuit in response to a second IP block clock request received from a second IP block. The power management unit (PMU) transmits a power control command to the first channel management circuit and the second channel management circuit to control a power state of the first IP block and the second IP block. The first channel management circuit transmits a third clock request to the second channel management circuit, and the second channel management circuit transmits an acknowledgement of receipt of the third clock request to the first channel management circuit, to maintain a master-slave relationship.

According to an exemplary embodiment of the present inventive concept, there is provided a semiconductor device including a first channel management circuit, a second channel management circuit, and a power management unit. The first channel management circuit provides a clock signal to a first intellectual property block (IP block). The second channel management circuit receives a clock request from the first channel management circuit and provides a clock signal to the second IP block in accordance with the clock request. The power management unit (PMU) transmits a power control command to the first channel management circuit and the second channel management circuit to control power states of the first IP block and the second IP block.

According to an exemplary embodiment of the present inventive concept, there is provided a system-on-chip (SoC) comprising the above described semiconductor device, first IP block, and second IP block. The SoC may further include an external device (e.g., a memory device, a display device, a network device, a storage device, and an input/output device), wherein the SoC controls the external device.

According to an exemplary embodiment of the present inventive concept, there is provided a method for operating a semiconductor device including: a first clock management circuit transmitting a clock request to a second channel management circuit, the first clock management circuit providing a clock signal to a first intellectual property block (IP block); the second clock management circuit providing a clock signal to a second IP block based on the clock request; the second channel management circuit transmitting an acknowledgement of receipt of the clock request to the first channel management circuit; and the second clock management circuit controlling a power state of the second IP block based on a power control command received from a power management unit (PMU) circuit.

BRIEF DESCRIPTION OF THE DRAWINGS

The present inventive concept will become more apparent by describing in detail exemplary embodiments thereof with reference to the attached drawings, in which.

DETAILED DESCRIPTION OF THE EXEMPLARY EMBODIMENTS

Figure 1:
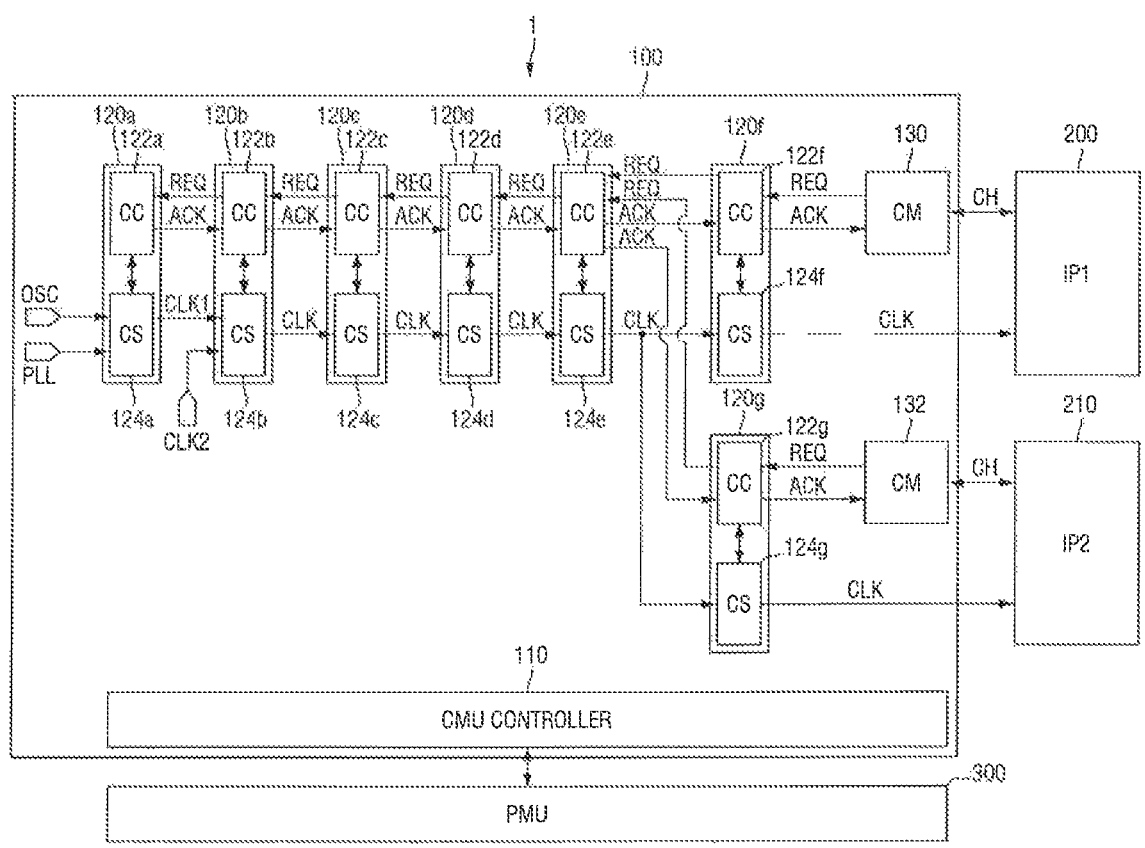
FIG. 1 is a schematic diagram for explaining a semiconductor device according to an exemplary embodiment of the present inventive concept.

FIG. 1 is a schematic diagram for explaining a semiconductor device according to an exemplary embodiment of the present inventive concept.

Referring to FIG. 1, a semiconductor device 1 according to an exemplary embodiment of the present inventive concept includes a clock management unit (CMU) 100, intellectual property blocks (IP blocks) 200 and 210, and a power management unit (PMU) 300. The CMU may be implemented by a circuit. In an exemplary embodiment, the semiconductor device 1 is implemented as a system-on-chip (SoC), but the scope of the present disclosure is not limited thereto.

The clock management unit 100 provides a clock signal to the IP blocks 200 and 210. While the embodiment depicted in FIG. 1 shows two IP blocks, the inventive concept is not limited thereto. For example, there may be additional IP blocks or just a single IP block in an alternate embodiment. In this embodiment, the clock management unit 100 includes clock components 120*a*, 120*b*, 120*c*, 120*d*, 120*e*, 120*f* and 120*g*, channel management circuits 130 and 132, and a clock management unit controller (CMU controller) 110. The clock components 120*a*, 120*b*, 120*c*, 120*d*, 120*e*, 120*f* and 120*g* generate a clock signal to be provided to the IP blocks 200 and 210, and the channel management circuits 130 and 132 are disposed between the clock components 120*f* and 120*g* and the IP blocks 200 and 210 to provide a communication channel CH between the clock management unit 100 and the IP blocks 200 and 210. Further, the clock management unit controller 110 provides the clock signals to the IP blocks 200 and 210, using the clock components 120*a*, 120*b*, 120*c*, 120*d*, 120*e*, 120*f* and 120*g*.

In an embodiment, the clock component 120*a* is implemented by a phase-locked loop (PLL) controller. In an embodiment, the PLL controller receives from an oscillator OSC, a constant or variable frequency signal oscillated by the oscillator OSC and a PLL signal output by a PLL, and outputs one of the two received signals based on a certain condition. When the components need the PLL signal, the PLL controller outputs the PLL signal. When the components need the oscillator signal, the PLL controller outputs the oscillator signal. For example, the PLL controller can be implemented using a ring oscillator or a crystal oscillator. In an embodiment, the clock component 120*b* is a clock multiplexer unit that receives a first clock signal CLK1 from the first clock component 120*a* and a second clock signal CLK2 from an external source (e.g., an external CMU).

In an exemplary embodiment of the present inventive concept, the communication channel CH provided by the channel management circuits 130 and 132 is provided to conform to a Low Power Interface (LPI), a Q-channel interface (ARC) or a P-channel interface of the ARM company, but the scope of the present disclosure is not limited thereto. For example, a communication channel CH conforming to an arbitrary communication protocol defined according to various purposes may be provided.

Each of the clock components 120*a*, 120*b*, 120*c*, 120*d*, 120*e*, 120*f* and 120*g* includes clock sources 124*a*, 124*b*, 124*c*, 124*d*, 124*e*, 124*f* and 124*g*, and clock control circuits 122*a*, 122*b*, 122*c*, 122*d*, 122*e*, 122*f* and 122*g* that control each of the clock sources 124*a*, 124*b*, 124*c*, 124*d*, 124*e*, 124*f* and 124*g*. The clock sources 124*a*, 124*b*, 124*c*, 124*d*, 124*e*, 124*f* and 124*g*, for example, may include a multiplexing circuit (MUX circuit), a clock dividing circuit, a short stop circuit, or a clock gating circuit. The MUX circuit may be used to receive multiple clock signals as input and select one of the received clock signals as output. The clock dividing circuit may be used to divide an input clock signal by a value to generate a divided clock signal. The value may be an integer as an example. The clock dividing circuit may be used to change the frequency of the input clock signal. In an embodiment, the short stop circuit temporally sets a clock signal to one logic level (e.g., typically a low level). For example, the clock signal output by the short stop circuit would include a first period with pulses from the input clock signal, a second period with no pulses (e.g., a constant low level), and then a third period with pulses from the input clock signal. The length of the second period can be varied based on the application.

The clock components 120*a*, 120*b*, 120*c*, 120*d*, 120*e*, 120*f* and 120*g* form a parent-child relationship with each other. In the present embodiment, the clock component 120*a* is a parent of the clock component 120*b*, and the clock component 120*b* is a child of the clock component 120*a* and a parent of the clock component 120*c*. Also, the clock component 120*e* is a parent of the two clock components 120*f* and 120*g*, and the clock components 120*f* and 120*g* are children of the clock component 120*e*. The clock component 120*a* disposed to be closest to a phase locked loop (PLL) may be referred to as a root clock component, and the clock components 120*f* and 120*g* disposed closest to the IP blocks 200 and 210 may be referred to as leaf clock components. Such a parent-child relationship is also inevitably formed among the clock control circuits 122*a*, 122*b*, 122*c*, 122*d*, 122*e*, 122*f* and 122*g* and among the clock sources 124*a*, 124*b*, 124*c*, 124*d*, 124*e*, 124*f* and 124*g* based on the parent-child relationship among the clock component 120*a*, 120*b*, 120*c*, 120*d*, 120*e*, 120*f* and 120*g*.

The clock control circuits 122*b*, 122*c*, 122*d*, 122*e*, 122*f* and 122*g* transmit a clock request (REQ) signal to a parent clock control circuit. The clock control circuits 122*a*, 122*b*, 122*c*, and 122*d* receive the REQ signal from a child clock control circuit. The clock control circuit 122e receives a REQ signal from each of two children clock control circuits, namely the clock control circuit 122f and the clock control circuit 122g. The clock control circuits 122f and 122g receive the REQ signal from the channel management circuits 130 and 132, respectively. The clock control circuits 122a, 122b, 122c, and 122d transmit an acknowledgment (ACK) signal to a child clock control circuit. The clock control circuits 122b, 122c, 122d, and 122e receive the ACK signal from a parent clock control circuit. The clock control circuit 122e transmits a first ACK signal to the clock control circuit 122f and a second ACK signal to the clock control circuit 122g. The clock control circuit 122f and clock control circuit 122g transmit an ACK signal to the channel management circuits 130 and 132, respectively. The clock sources 124a, 124b, 124c, 124d, 124e, 124f and 124g provide a clock signal to the IP blocks 200 and 210.

For example, if the IP block 200 does not require the clock signal, for example if the IP block 200 needs to be in a sleep state, the clock management unit 100 stops providing the clock signal to the IP block 200.

In an exemplary embodiment, the channel management circuit 130 transmits a first signal to the IP block 200 indicating that provision of the clock signal to the IP block 200 is to stop, under the control of the clock management unit 100 or the clock management unit controller 110. Upon receiving the first signal, the IP block 200 transmits a second signal to the channel management circuit 130 indicating that the clock signal can be stopped immediately or stopped after a particular event. For example, the second signal can indicate that the clock signal may be stopped after completion of a job (e.g., a command, a program, etc.) being processed by the IP block 200. After receiving the second signal from the IP block 200, the channel management circuit 130 requests the clock component 120f corresponding to its parent to stop the provision of the clock signal. For example, the channel management circuit 130 can make this request by sending a REQ signal to clock component 120f.

As an example, if the communication channel CH provided by the channel management circuit 130 conforms to the Q-channel interface, the channel management circuit 130 transmits a QREQn signal having a first logic value (e.g., logic low, hereinafter, indicated by L) as the first signal to the IP block 200. Thereafter, the channel management circuit 130 receives, for example, a QACCEPTn signal having the first logic value as the second signal from the IP block 200, and then transmits the clock request (REQ), for example, having the first logic value to the clock component 120f. In this case, the clock request (REQ) having the first logic value refers to "clock provision stop request".

Upon receiving the clock request (REQ) having the first logic value (e.g., the clock provision stop request) from the channel management circuit 130, the clock control circuit 122f disables the clock source 124f (e.g., a clock gating circuit) to stop the provision of the clock signal, and the IP block 200 may enter the sleep mode accordingly. In this process, the clock control circuit 122f may provide the channel management circuit 130 with an ACK signal having the first logic value. It should be noted that, even though the channel management circuit 130 receives the ACK signal having the first logic value after transmitting the clock provision stop request having the first logic value, the stop of the clock provision from the clock source 124f is not ensured. However, the above-mentioned ACK signal means that the clock control circuit 122f recognizes that the clock component 120f which is the parent of the channel management circuit 130 does not need to further provide a clock signal to the channel management circuit 130.

In an exemplary embodiment, the clock control circuit 122f of the clock component 120f transmits a clock request (REQ) having the first logic value to the clock control circuit 122e of the clock component 120e corresponding to its parent. If the IP block 210 also does not require a clock signal, for example, when the clock control circuit 122e receives a clock stop request from the clock control circuit 122g, the clock control circuit 122e disables the clock source 124e (e.g., a clock dividing circuit) to stop the provision of the clock signal. As a result, the IP blocks 200 and 210 may enter the sleep mode. For example, in this embodiment, the clock source 124f does not stop the provision of the clock signal until it receives an ACK signal having the first logic value from both child clock control circuits 122f and 122g.

Such an operation may be similarly performed on other clock control circuits 122a, 122b, 122c and 122d.

In an exemplary embodiment, even though the clock control circuit 122f of the clock component 120f transmits the clock request (REQ) signal having the first logic value to the clock control circuit 122e of the clock component 120e corresponding to its parent, if the IP block 210 is in the running state, the clock control circuit 122e does not disable the clock source 124e. Thereafter, only when the IP block 210 no longer requires a clock signal, the clock control circuit 122e disables the clock source 124e, and transmits the clock request (REQ) having the first logic value to the clock control circuit 120d corresponding to its parent. That is, the clock control circuit 122e disables the clock source 124e, only when receiving a clock provision stop request from both of the clock control circuits 122f and 122g corresponding to the child.

In an exemplary embodiment, when all the clock sources 124a, 124b, 124c, 124d, 124e and 124f are disabled during the sleep state of the IP blocks 200 and 210 and then the IP block 200 enters the running state, the clock management unit 100 resumes the provision of the clock signal to the IP blocks 200 and 210.

The channel management circuit 130 transmits the clock request (REQ) signal having a second logic value (e.g., logic high, hereinafter indicated by H) to the clock control circuit 122f of the clock component 120f corresponding to its parent, and waits for the acknowledgment (ACK) from the clock control circuit 122f. Here, the clock request (REQ) having the second logic value refers to a "clock provision request", and the acknowledgment (ACK) signal of the clock supply request means that the clock provision has resumed from the clock source 124f. In an embodiment, the clock control circuit 122f does not immediately enable the clock source 124f (e.g., a clock gating circuit) and waits for provision of the clock signal from the parent. In an embodiment, the clock control circuit 122f waits until it receives an ACK signal from the parent before enabling the clock source 124f.

Next, the clock control circuit 122f transmits a clock request (REQ) having a second logic value (e.g., a clock provision request) to the clock control circuit 122e corresponding to its parent, and waits for the acknowledgment (ACK) from the clock control circuit 122e. Such an operation may be similarly performed on the clock control circuits 122a, 122b, 122c and 122d.

The clock control circuit 122a, which is a root clock component having received the clock request (REQ) having the second logic value from the clock control circuit 122b, enables the clock source 124a (e.g., a multiplexing circuit), and transmits the acknowledgment (ACK) signal to the clock control circuit 122b. When the clock sources 124b, 124c, 124d, 124d and 124e are sequentially enabled in such a manner, the clock control circuit 122e transmits the acknowledgment (ACK) signal indicating that clock provision has resumed from the clock source 124e, to the clock control circuit 122f.

Upon receiving the acknowledgment (ACK) signal, the clock control circuit 122f enables the clock source 124f, provides the clock signal to the IP block 200, and provides the acknowledgment (ACK) signal to the channel management circuit 130.

In this way, the clock control circuits 122a, 122b, 122c, 122d, 122e, 122f and 122g operate in a manner of a full handshake (e.g., synchronous handshaking) by exchanging the clock request (REQ) signal and the acknowledgment (ACK) signal between the parent and the child. As a result, the clock control circuits 122a, 122b, 122c, 122d, 122e, 122f and 122g control the clock sources 124a, 124b, 124c, 124d, 124e, 124f and 124g in a hardware manner, and control the clock signal provided to the IP blocks 200 and 210.

The clock control circuits 122a, 122b, 122c, 122d, 122e, 122f and 122g may independently operate to transmit the clock request (REQ) signal to the parent or control the clock sources 124a, 124b, 124c, 124d, 124e, 124f and 124g, and may operate under the control of the clock management unit controller 110. In an exemplary embodiment of the inventive concept, the clock control circuits 122a, 122b, 122c, 122d, 122e, 122f and 122g include a finite state machine (FSM) which controls each of the clock sources 124a, 124b, 124c, 124d, 124e, 124f and 124g based on the clock request (REQ) signal exchanged between the parent and the child.

Figure 2:
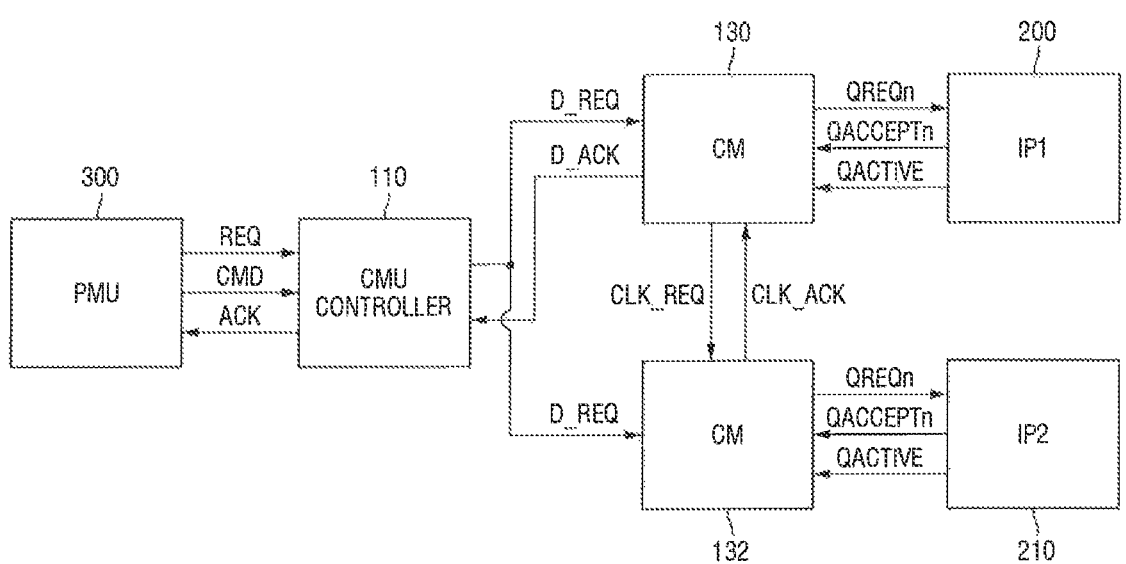
FIG. 2 is a schematic diagram for explaining a semiconductor device according to an exemplary embodiment of the present inventive concept.

FIG. 2 is a schematic diagram for explaining a semiconductor device according to an exemplary embodiment of the present inventive concept.

Referring to FIG. 2, in the semiconductor device 1 according to the embodiment of the present inventive concept, the power management unit 300 transmits a power control command (CMD) to the clock management unit 110, in order to execute a power control operation of the IP blocks 200 and 210 and control the power state of the IP blocks 200 and 210. In an exemplary embodiment of the present inventive concept, the power control command CMD includes a power-down command (D_REQ) to instruct the IP blocks 200 and 210 to enter the sleep mode. In an embodiment, the IP blocks 200 and 210 use less power in the sleep mode and more power in a normal mode. For example, during the sleep mode, the IP blocks may perform a lesser number of functions than in the normal mode.

In an exemplary embodiment of the present inventive concept, the IP block 200 and the IP block 210 have a master-slave relationship. In an embodiment, the IP block 200 is a master device and the IP block 210 is a slave device. In this case, the IP block 210 (i.e., the slave) enters the sleep mode only when the IP block 200 (e.g., the master) is in the sleep mode, and the IP block 200 wakes up (e.g., exits the sleep mode) only after the IP block 210 wakes up. The operations of the channel management circuit 130 of the IP block 200 and the channel management circuit 132 of the IP block 210 based on such a master-slave relationship will be described with reference to FIGS. 3 to 5 in more detail below.

Upon receiving the power control command CMD from the power management unit 300, the clock management unit controller 110 controls the channel management circuits 130 and 132 based on the power control command CMD, and thereafter, the clock management unit controller 110 transmits the acknowledgment (ACK) signal to the power management unit 300.

In an exemplary embodiment, the clock management unit controller 110 transmits the power-down command (D_REQ) to the channel management circuit 130 in charge of the communication channel with the master IP block 200, and the channel management circuit 132 in charge of the communication channel with the slave IP block 210. Upon receiving the power-down command (D_REQ), the channel management circuits 130 and 132 set a value of QREQn to L regardless of the value of QACTIVE received from the IP blocks 200 and 210. The channel management circuits 130 and 132 know whether the IP blocks 200 and 210 have entered the sleep mode by checking that the value of QACCEPTn changes to L. In an embodiment, the power-down command (D_REQ) has a higher priority than a wake-up command that causes the IP blocks 200 and 210 to enter the wake-up mode (i.e., leave the sleep mode).

After the channel management circuits 130 and 132 complete the operation according to the power-down command (D_REQ), only the channel management circuit 130 transmits the acknowledgment (D_ACK) signal of the power-down command (D_REQ) to the clock management unit controller 110.

The channel management circuit 130 in charge of the communication channel with the master IP block 200 and the channel management circuit 132 in charge of the communication channel with the slave IP block 210 exchange a clock request (CLK_REQ) signal and an acknowledgment (CLK_ACK) signal to form a master-slave relationship.

Figure 3:
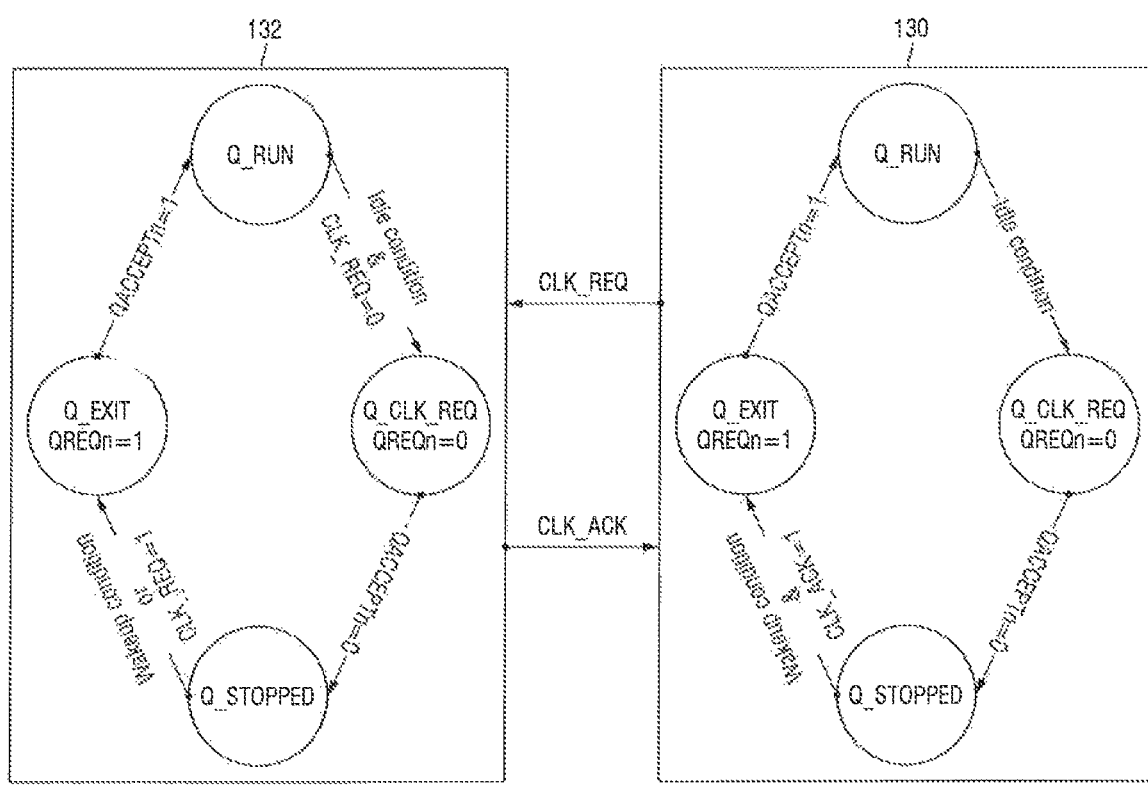
FIG. 3 is a schematic diagram for explaining an exemplary operation of the semiconductor device according to an exemplary embodiment of the present inventive concept.

FIG. 3 is a schematic diagram for explaining an exemplary operation of the semiconductor device according to the exemplary embodiment of the present inventive concept.

Referring to FIG. 3, the channel management circuits 130 and 132 have a running state (Q_RUN), a sleep mode entry state (Q_CLK_REQ), a sleep state (Q_STOPPED) and a sleep mode exit state (Q_EXIT).

When the idle condition for causing the IP blocks 200 and 210 to exit the running state (Q_RUN) is satisfied, the channel management circuits 130 and 132 are converted into the sleep mode entry state (Q_CLK_REQ) to set the value of QREQn to L. After that, after checking that the value of QACCEPTn received from the IP blocks 200 and 210 changes to L, the channel management circuits 130 and 132 are converted into the sleep state (Q_STOPPED).

Next, when the wakeup condition for waking up the IP blocks 200 and 210 is satisfied, the channel management circuits 130 and 132 are converted into the sleep mode exit state (Q_EXIT) to set the value of QREQn to H, and then, after checking that the value of QACCEPTn received from the IP blocks 200 and 210 changes to H, the channel management circuits 130 and 132 are converted into the running state (Q_RUN).

It should be noted that, since the channel management circuit 130 is in charge of the communication channel with the master IP block 200 and the channel management circuit 132 is in charge of the communication channel with the slave IP block 210, the channel management circuit 130 and the channel management circuit 132 also have a master-slave relationship. Accordingly, the following restrictions may occur.

In an exemplary embodiment, the channel management circuit 130 provides a signal (CLK_REQ=L) indicating that the supply of the clock signal is to be stopped to the channel management circuit 132 only when the channel management circuit 130 is converted to the sleep state (Q_STOPPED). In an embodiment, the channel management circuit 132 is not converted into the sleep mode entry state (Q_CLK_REQ) when the channel management circuit 130 continuously makes the clock request (CLK_REQ=H) and the idle condition is satisfied. Therefore, in order for the channel management circuit 132 to be converted to the sleep mode entry state (Q_CLK_REQ), the idle condition for causing the IP block 210 to enter the sleep mode needs to be satisfied, and at the same time, it is necessary to receive a signal (CLK_REQ=L) indicating that the clock signal is to be stopped, from the channel management circuit 130. For example, the slave IP block 210 enters the sleep mode only when the master IP block 200 is already in the sleep mode.

In an exemplary embodiment, the channel management circuit 132 sends a CLK_ACK=L to the channel management circuit 130 after receiving the CLK_REQ=L from the channel management circuit 130. In this embodiment, the channel management circuit 132 does not instruct the master IP block 200 to sleep until it receives an acknowledgement (e.g., CLK_ACK=L) from the channel management circuit 132 indicating that the slave IP block 210 has been instructed to sleep.

Further, when the channel management circuit 130 in the sleep state (Q_STOPPED) satisfies the wakeup condition, the channel management circuit 130 sends a clock request (CLK_REQ=H) to the channel management circuit 132, and is converted into the sleep mode exit state (Q_EXIT) only after receiving the acknowledgement (CLK_ACK=H) of the clock request (CLK_REQ=H) from the channel management circuit 132. When the channel management circuit 132 is in the sleep state (Q_STOPPED), even when the wakeup condition is not satisfied, if the clock request (CLK_REQ=H) is received from the channel management circuit 130, the channel management circuit 132 is immediately converted into the sleep mode exit state (Q_EXIT) and transmits the acknowledgement (CLK_ACK=H) to the channel management circuit 130. For example, the master IP block 200 wake ups only after the slave IP block 210 wakes up.

Figure 4:
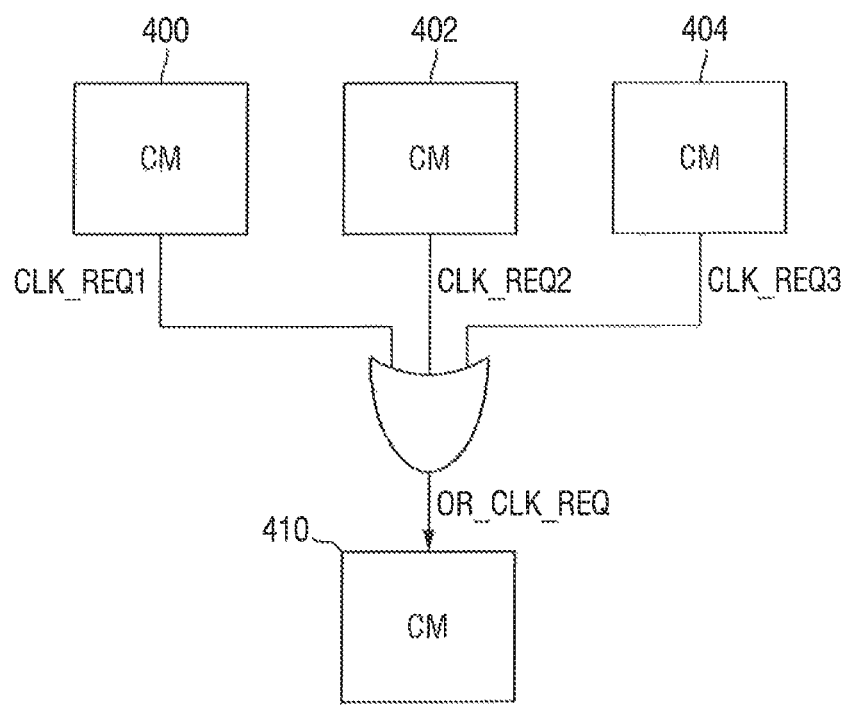
FIG. 4 is a schematic diagram for explaining an exemplary operation of a semiconductor device according to an exemplary embodiment of the present inventive concept.
Figure 5:
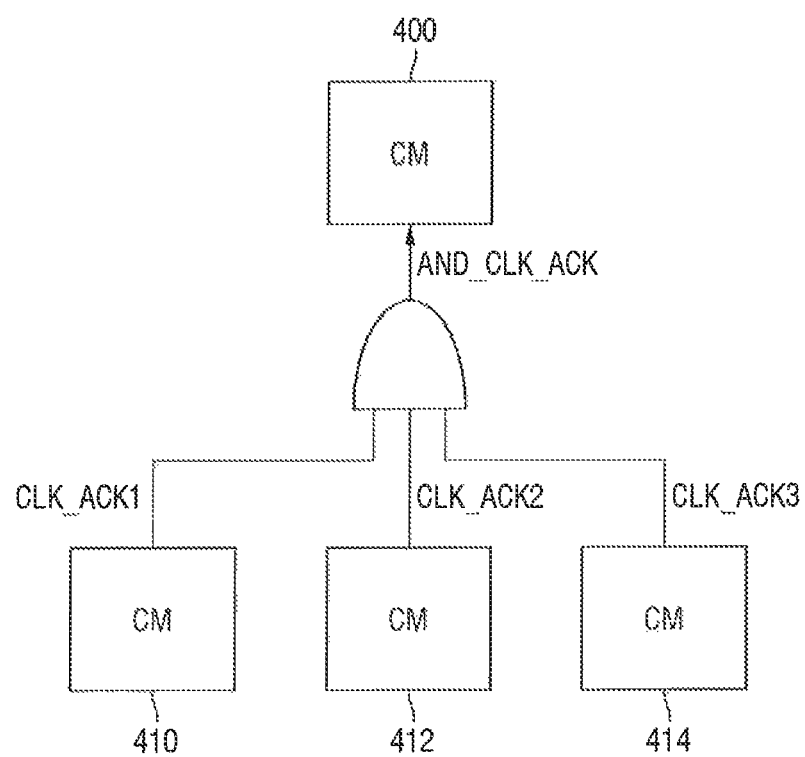
FIG. 5 is a schematic diagram for explaining an exemplary operation of a semiconductor device according to an exemplary embodiment of the present inventive concept.

FIG. 4 is a schematic diagram for explaining an exemplary operation of a semiconductor device according to an exemplary embodiment of the present inventive concept, and FIG. 5 is a schematic diagram for explaining an exemplary operation of a semiconductor device according to an exemplary embodiment of the present inventive concept.

Referring to FIG. 4, in an exemplary embodiment of the present inventive concept, when an IP block includes a plurality of master IP blocks and a single slave IP block, a first circuit including a channel management circuit 410 in charge of a communication channel with the slave IP block receives a plurality of clock requests (CLK_REQ1, CLK_REQ2 and CLK_REQ3) from the channel management circuits 400, 402 and 404 in charge of the communication channels with the plurality of master IP blocks. For example, the first circuit may include an OR gate and the channel management circuit 410.

In this embodiment, the first circuit receives a plurality of clock requests (CLK_REQ1, CLK_REQ2 AND CLK_REQ3) and performs an OR logic operation on the plurality of clock requests (CLK_REQ1, CLK_REQ2 AND CLK_REQ3) to generate a single clock request (OR_CLK_REQ). In other words, when only one of the plurality of master IPs makes a clock request, the slave IP needs to wake up. For example, if CLK_REQ1 has a logic H, even if CLK_REQ2 and CLK_REQ3 are logic L, since they are OR'd with each other, the channel management circuit 410 will interpret the result as requiring that the slave IP wake up.

Referring to FIG. 5, in an exemplary embodiment of the present inventive concept, if the IP block includes a single master IP block and a plurality of slave IP blocks, a second circuit including the channel management circuit 400 in charge of the communication channel with the master IP block receives a plurality of acknowledgements (CLK_ACK1, CLK_ACK2 and CLK_ACK3) from the channel management circuits 410, 412 and 414 which are in charge of the communication channel with the plurality of slave IP blocks. For example, the second circuit may include an AND gate and the channel management circuit 400.

In this embodiment, the second circuit receives a plurality of acknowledgements (CLK_ACK1, CLK_ACK2 and CLK_ACK3) and performs an AND logic operation on the plurality of acknowledgements (CLK_ACK1, CLK_ACK2 and CLK_ACK3) to generate a single acknowledgement (AND_CLK_ACK). For example, the master IP wakes up only when all the plurality of slave IPs wake up. For example, if any one of CLK_ACK1, CLK_ACK2, and CLK_ACK are logic L, since they are AND'd with each other, the channel management circuit 410 will interpret the result as not requiring that the master IP wake up.

Figure 6:
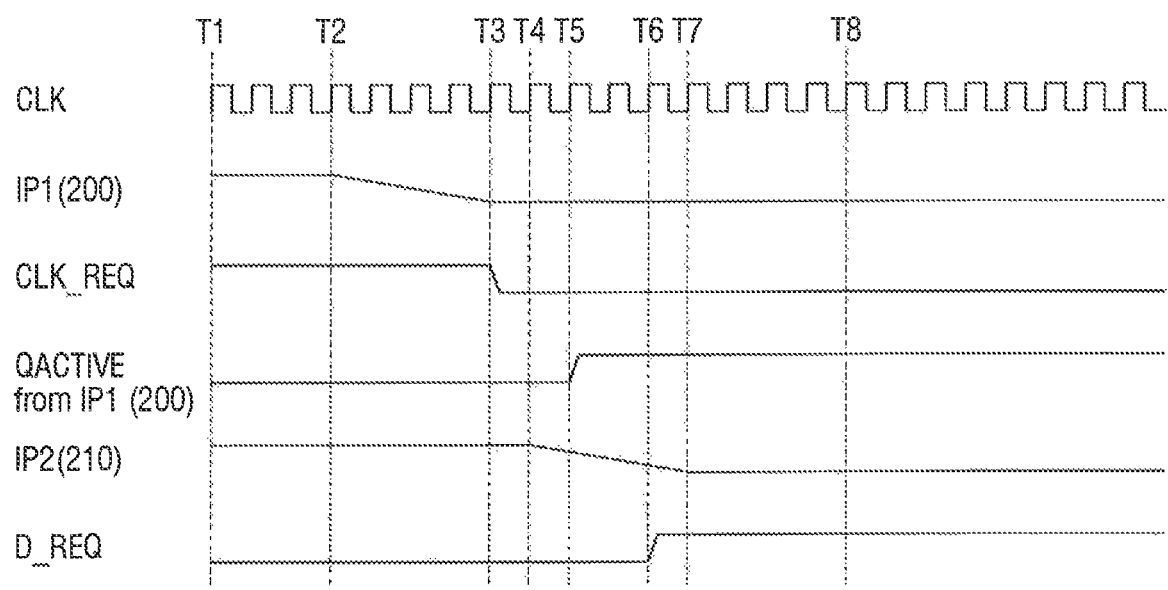
FIG. 6 is a timing diagram for explaining an exemplary operation of the semiconductor device according to an exemplary embodiment of the present inventive concept.

FIG. 6 is a timing diagram for explaining an exemplary operation of the semiconductor device according to an exemplary embodiment of the present inventive concept.

Referring to FIG. 6, the master IP block 200 that was in the running state (IP1=H) at T1 starts to enter the sleep mode at T2, and is converted into the sleep state (IP1=L) at T3. As a result, the channel management circuit 130 of the master IP block 200 provides a signal (CLK_REQ=L) indicating that the clock provision is to be stopped to the channel management circuit 132 of the slave IP block 210, thereby inducing the slave IP block 210 to enter the sleep mode.

As a result, the slave IP block 210 starts to enter the sleep mode at T4, and is converted to the sleep state (IP2=L) at T7. As described above, in order for the master IP block 200 to wake up later, the slave IP block 210 needs to first wake up.

However, when receiving the power-down command (D_REQ) from the clock management unit controller 110 at T6, while the slave IP block 210 enters the sleep mode in the intervals of T4 to T7, since the priority of the power-down command (D_REQ) is higher than the wakeup command received from the master IP block 200 (e.g., the clock request (CLK_REQ=H)), after T6, the channel management circuit 132 of the slave IP block 210 ignores the clock request (CLK_REQ) received from the channel management circuit 130 of the master IP block 200.

Therefore, when the master IP block 200 satisfies the wakeup condition at T5 and waits for the wake-up of the slave IP block 210 with the QACTIVE value being H, since the channel management circuit 132 of the of the slave IP block 210 ignores the clock request (CLK_REQ) received from the channel management circuit 130 of the master IP block 200, a deadlock in which both of the master IP block 200 and the slave IP block 210 do not wake up may occur.

Figure 7:
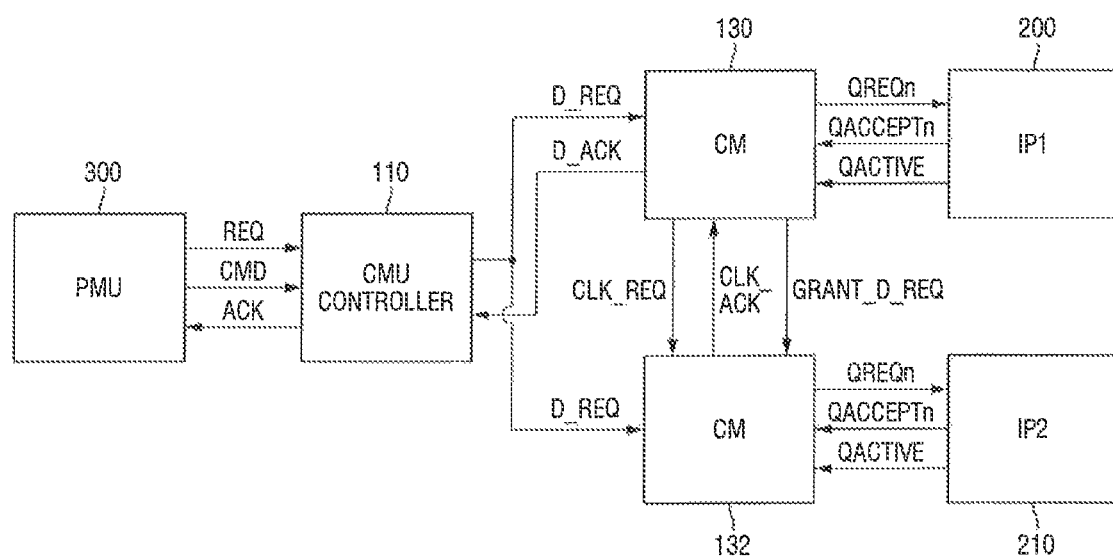
FIGS. 7 and 8 are schematic diagrams for explaining a semiconductor device according to an exemplary embodiment of the present inventive concept.
Figure 8:
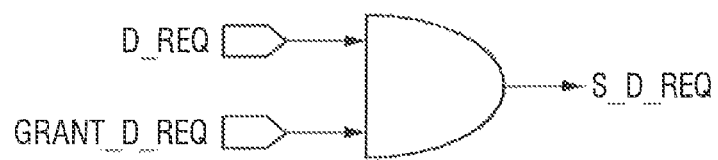

FIGS. 7 and 8 are schematic diagrams for explaining a semiconductor device according to an exemplary embodiment of the present inventive concept.

Referring to FIGS. 7 and 8, in order to prevent the occurrence of the deadlock described with reference to FIG. 6, in the semiconductor device according to an exemplary embodiment of the present inventive concept, the channel management circuit 130 of the master IP block 200 transmits a grant signal (GRANT_D_REQ) to the channel management circuit 132 of the slave IP block 210. The grant signal (GRANT_D_REQ) is a signal for determining whether or not the channel management circuit 132 operates based on the power control command (e.g., the power-down command (D_REQ)) in consideration of the master-slave relationship.

In an exemplary embodiment, the channel management circuit 132 of the slave IP block 210 performs the power-down operation based on a signal derived from the power-down command (D_REQ) received from the clock management unit controller 110 and a grant signal (S_D_REQ) received from the channel management circuit 130 of the master IP block 200. For example, the channel management circuit 132 may include an AND gate shown in FIG. 8 that receives D_REQ and GRANT_D_REQ, and performs an AND logic operation on D_REQ and GRANT_D_REQ to obtain a grant signal (S_D_REQ).

As a result, in a situation where the slave IP block 210 receives the power-down command (D_REQ) from the clock management unit controller 110 but the master IP block 200 needs to wake up, the slave IP block 210 wakes up. In an exemplary embodiment, when the state in which the master IP block 200 can perform the power-down operation is transmitted to the slave IP block 210 as the grant signal (GRANT_D_REQ), the slave IP block 210 is subjected to a power-down by ensuring that the master IP block 200 does not wake up.

When the power-down of the IP blocks 200 and 210 has completed, only the channel management circuit 130 transmits the acknowledgement (D_ACK) of the power-down command (D_REQ) to the clock management unit controller 110.

Figure 9:
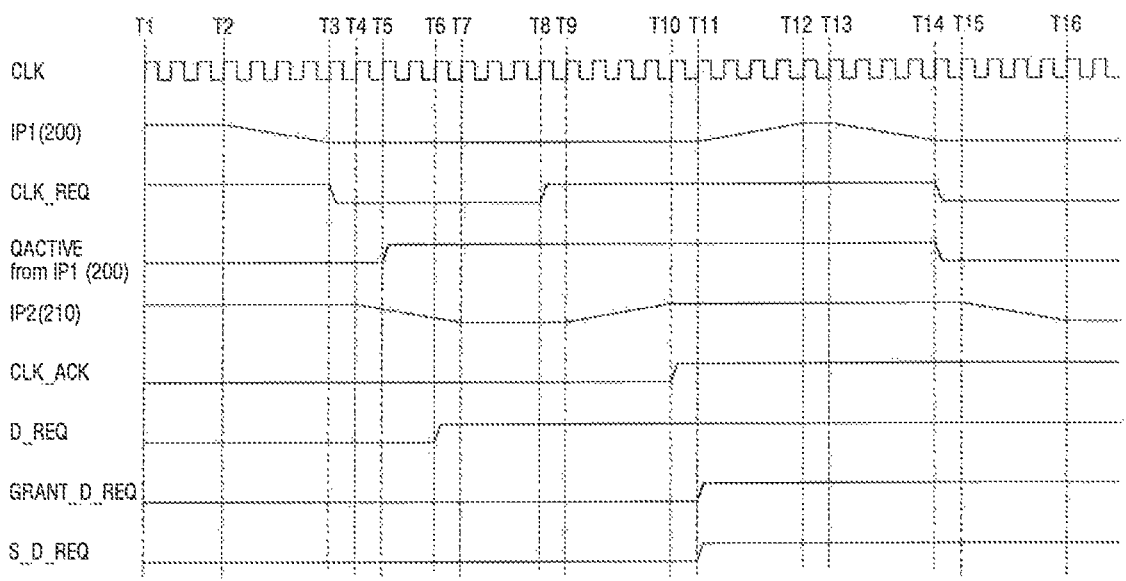
FIG. 9 is a timing diagram for explaining an exemplary operation of the semiconductor device according to an exemplary embodiment of the present inventive concept.

FIG. 9 is a timing diagram for explaining an exemplary operation of the semiconductor device according to an exemplary embodiment of the present inventive concept.

Referring to FIG. 9, the master IP block 200 that was in the running state (IP1=H) at T1 starts to enter the sleep mode at T2 and is converted into the sleep state (IP1=L) at T3. As a result, the channel management circuit 130 of the master IP block 200 provides a signal to the channel management circuit 132 of the slave IP block 210 (CLK_REQ=L) that indicates the clock provision is to be stopped, and induces the slave IP block 210 to enter the sleep mode.

As a result, the slave IP block 210 starts to enter the sleep mode at T4 and is converted into the sleep state (IP2=L) at T7. As described above, in order for the master IP block 200 to wake up later, the slave IP block 210 needs to first wake up.

When receiving the power-down command (D_REQ) from the clock management unit controller 110 at T6 while the slave IP block 210 enters the sleep mode in the intervals T4 to T7, the priority of the power-down command (D_REQ) is higher than the wakeup command received from the master IP block 200 (e.g., the clock request (CLK_REQ=H)). However, since the channel management circuit 130 does not transmit the grant signal (GRANT_D_REQ) to the channel management circuit 130, after T6, the channel management circuit 132 of the slave IP block 210 does not ignore the clock request (CLK_REQ) received from the channel management circuit 130 of the master IP block 200.

Therefore, when the master IP block 200 satisfies the wakeup condition at T5 and waits for the wake-up of the slave IP block 210 with the QACTIVE value being H, the channel management circuit 132 of the slave IP block 210 wakes up from the interval of T9 to T10, based on the clock request (CLK_REQ) received from the channel management circuit 130 of the master IP block 200.

After that, in the channel management circuit 130, after the grant signal (GRANT_D_REQ) is transmitted to the channel management circuit 132 at T11, the power-down operation of the slave IP block 210 is performed.

Figure 10:
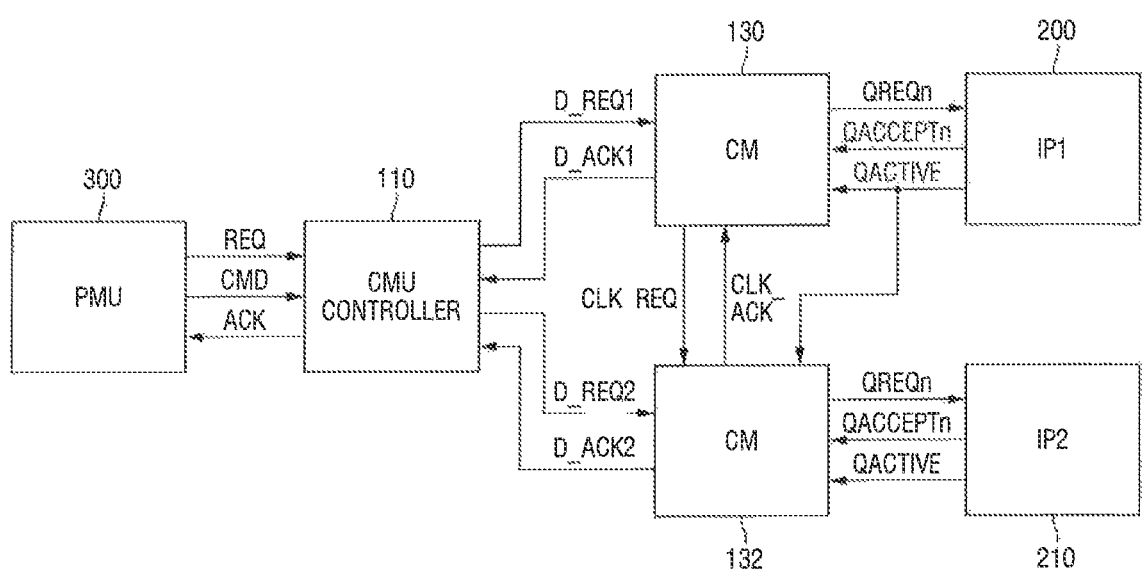
FIGS. 10 and 11 are schematic diagrams for explaining a semiconductor device according to an exemplary embodiment of the present disclosure.
Figure 11:
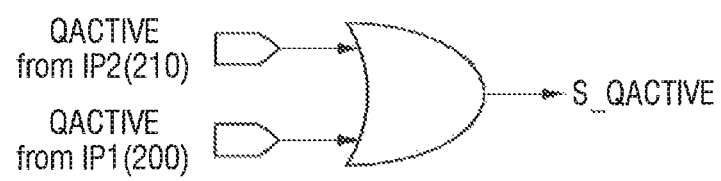

FIGS. 10 and 11 are schematic diagrams for explaining a semiconductor device according to an exemplary embodiment of the present inventive concept.

Referring to FIGS. 10 and 11, in order to prevent the occurrence of the deadlock described with reference to FIG. 6, in the semiconductor device according to an exemplary embodiment of the present inventive concept, the channel management circuit 132 of the slave IP block 210 receives the QACTIVE signal (the first active signal) transmitted to the channel management circuit 130 from the master IP block 200.

The present embodiment is based on a master-slave relationship where the restriction that the slave IP block 210 needs to wake up first before wakeup of the master IP block 200 is relaxed. As a result, each of the channel management circuits 130 and 132 receives the power-down commands (D_REQ1 and D_REQ2) from the clock management unit controller 110, and transmits the acknowledgements (D_ACK1 and D_ACK2) to the clock management unit 110 after the power-down has executed.

In an exemplary embodiment, the channel management circuit 132 of the slave IP block 210 performs the power-down operation based on the QACTIVE signal (the first active signal) transmitted to the channel management circuit 130 from the master IP block 200 and the QACTIVE signal (the second active signal) received from the slave IP block 210. For example, the channel management circuit performs the power-down operation based on a signal (S_QACTIVE) obtained by performing an OR logic operation on the QACTIVE signal (the first active signal) transmitted to the channel management circuit 130 from the master IP block 200 and the QACTIVE signal (the second active signal) received from the slave IP block 210. For example, the channel management circuit 132 may include an OR gate shown in FIG. 11 that performs the OR operation.

As a result, in a situation where the slave IP block 210 receives the power-down command (D_REQ) from the clock management unit controller 110 but the master IP block 200 needs to wake up, the slave IP block wakes up.

Figure 12:
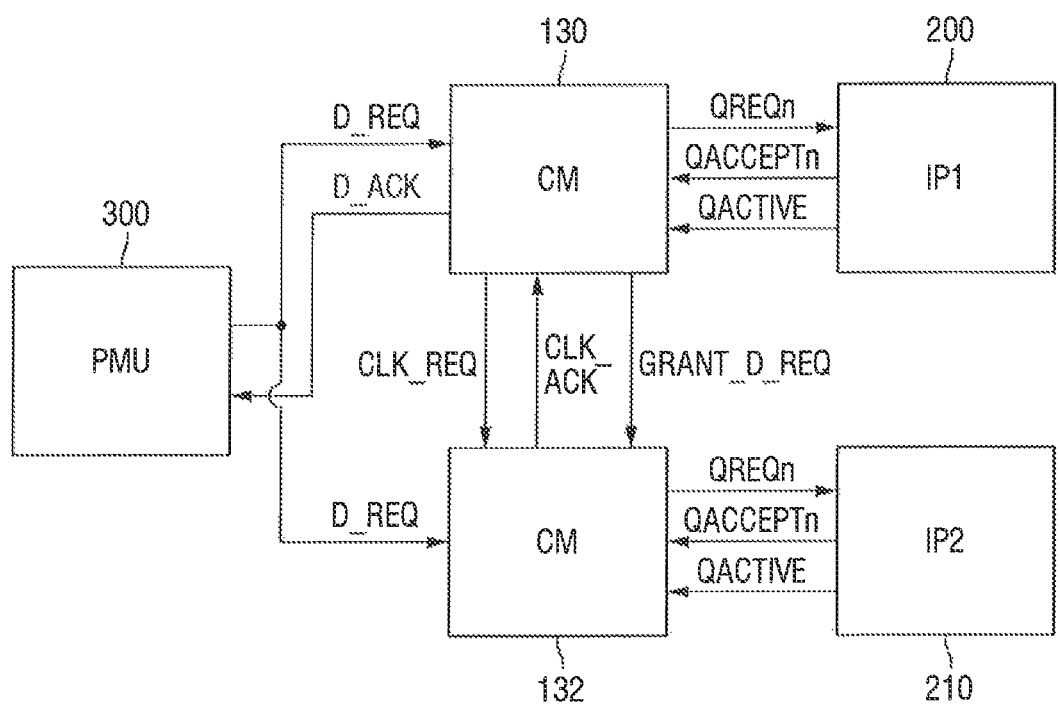
FIG. 12 is a schematic diagram for explaining a semiconductor device according to an exemplary embodiment of the present inventive concept.

FIG. 12 is a schematic diagram for explaining a semiconductor device according to an exemplary embodiment of the present inventive concept.

FIG. 12 differs from FIG. 7 in that the power management unit 300 directly transmits the power-down command (D_REQ) to the channel management circuits 130 and 132 in order to perform the power control operation of the IP blocks 200 and 210 and control the power state of the IP blocks 200 and 210.

As a result, the channel management circuit 132 of the slave IP block 210 performs the power-down operation, based on the power-down command (D_REQ) received from the power management unit 300 and the grant signal (GRANT_D_REQ) received from the channel management circuit 130 of the master IP block 200. For example, the channel management circuit performs the power-down operation based on the signal (S_D_REQ) obtained by performing the AND logic operation on the power-down command (D_REQ) received from the power management unit 300 and the grant signal (GRANT_D_REQ) received from the channel management circuit 130 of the master IP block 200.

Therefore, in a situation where the slave IP block 210 receives the power-down command (D_REQ) from the power management unit 300 but the master IP block 200 needs to wake up, the slave IP block 210 wakes up. In an exemplary embodiment, when the state in which the master IP block 200 can perform the power-down operation is transmitted to the slave IP block 210 as a grant signal (GRANT_D_REQ), the power-down of the slave IP block 210 is performed by ensuring that the master IP block 200 does not wake up.

When the power-down of the IP blocks 200 and 210 has completed, only the channel management circuit 130 transmits the acknowledgement (D_ACK) of the power-down command (D_REQ) to the power management unit 300.

Figure 13:
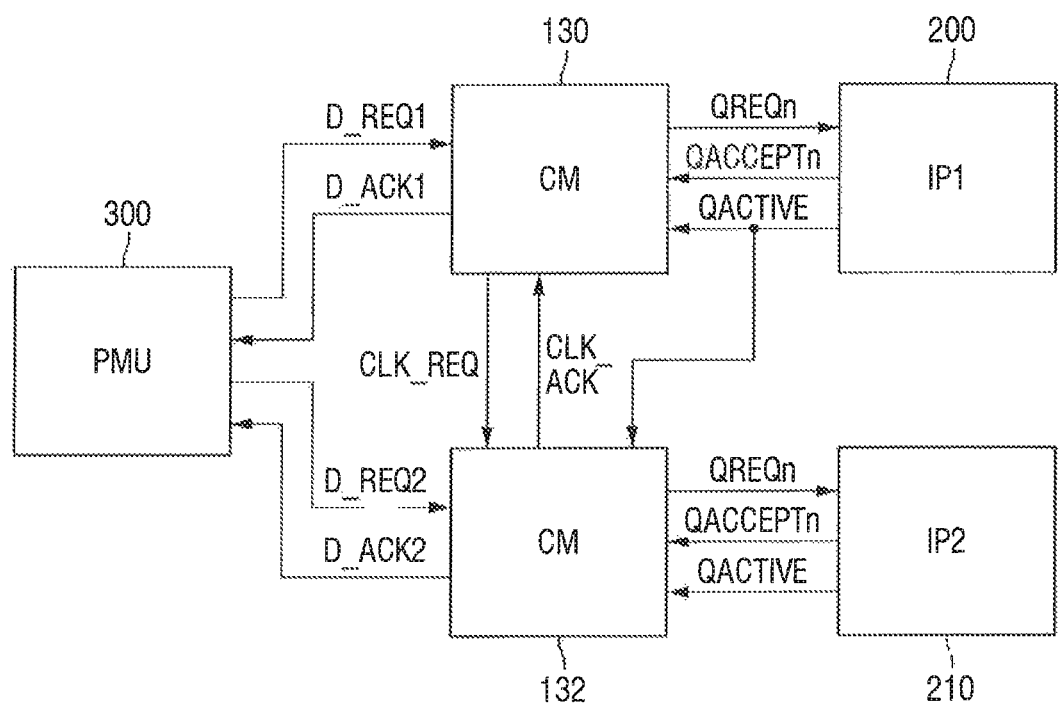
FIG. 13 is a schematic diagram for explaining a semiconductor device according to an exemplary embodiment of the present inventive concept.

FIG. 13 is a schematic diagram for explaining a semiconductor device according to an exemplary embodiment of the present inventive concept.

FIG. 13 differs from FIG. 10 in that the power management unit 300 directly transmits the power-down command (D_REQ) to the channel management circuits 130 and 132 in order to perform the power control operation of the IP blocks 200 and 210 and control the power state of the IP blocks 200 and 210.

Each of the channel management circuits 130 and 132 receives the power-down commands (D_REQ1 and D_REQ2) from the power management unit 300, and transmits the acknowledgements (D-ACk1 and D_ACK2) to the power management unit 300, after power-down has been performed.

The channel management circuit 132 of the slave IP block 210 performs a power-down operation based on the QACTIVE signal (the first active signal) transmitted to the channel management circuit 130 from the master IP block 200 and the QACTIVE signal (the second active signal) received from the slave IP block 210. For example, the channel management circuit 132 performs the power-down operation based on the signal (S_QACTIVE) obtained by performing the OR logic operation on the QACTIVE signal (the first active signal) transmitted to the channel management circuit 130 from the master IP block 200 and the QACTIVE signal (the second active signal) received from the slave IP block 210.

Accordingly, in a situation where the slave IP block 210 receives the power-down command (D_REQ) from the clock management unit controller 110 but the master IP block 200 needs to wake up, the slave IP block wakes up.

Figure 14:
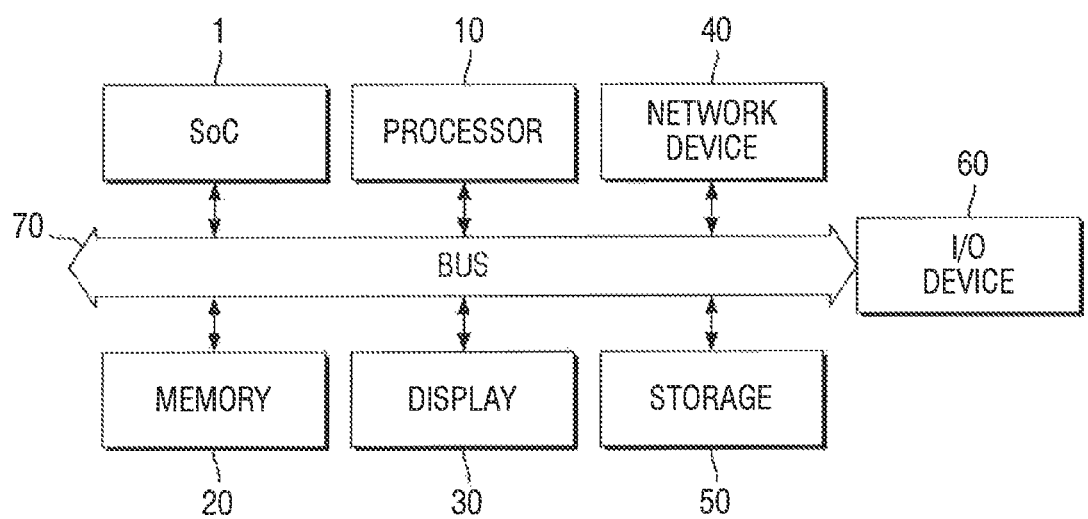
FIG. 14 is a block diagram of a semiconductor system to which a semiconductor device and a method of operating the semiconductor device according to at least one embodiment of the present inventive concept is applicable.

FIG. 14 is a block diagram of a semiconductor system to which the semiconductor device and the method of operating the semiconductor device according to some embodiments of the present inventive concept are applicable.

Referring to FIG. 14, the semiconductor system includes a semiconductor device (SoC) 1, a processor 10, a memory device 20, a display device 30, a network device 40, a storage device 50 and an input/output device 60. The semiconductor device (SoC) 1, the processor 10, the memory device 20, the display device 30, the network device 40, the storage device 50 and the input/output device 60 may transmit and receive data with one another via a bus 70.

The IP blocks inside the semiconductor device (SoC) 1 described in various embodiments of the present disclosure includes at least one of a memory controller which controls the memory device 20, a display controller which controls the display device 30, a network controller which controls the network device 40, a storage controller which controls the storage device 50, and an input/output controller which controls the input/output device 60. The semiconductor system may further include an additional processor 10 which controls these devices.

Figure 15:
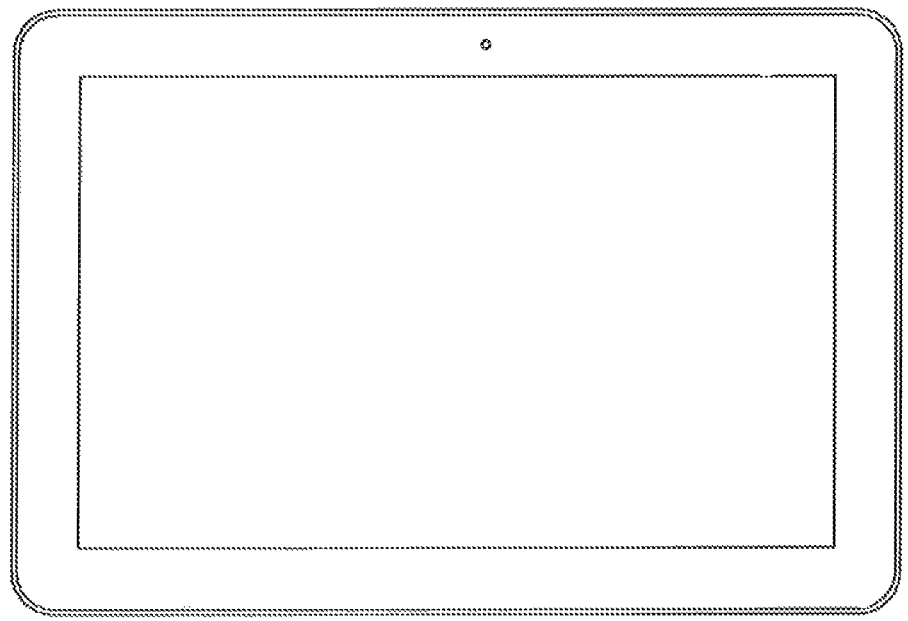
FIGS. 15 to 17 are exemplary semiconductor systems to which the semiconductor device and the method of operating the semiconductor device according to some embodiments of the present inventive concept are applicable.
Figure 16:
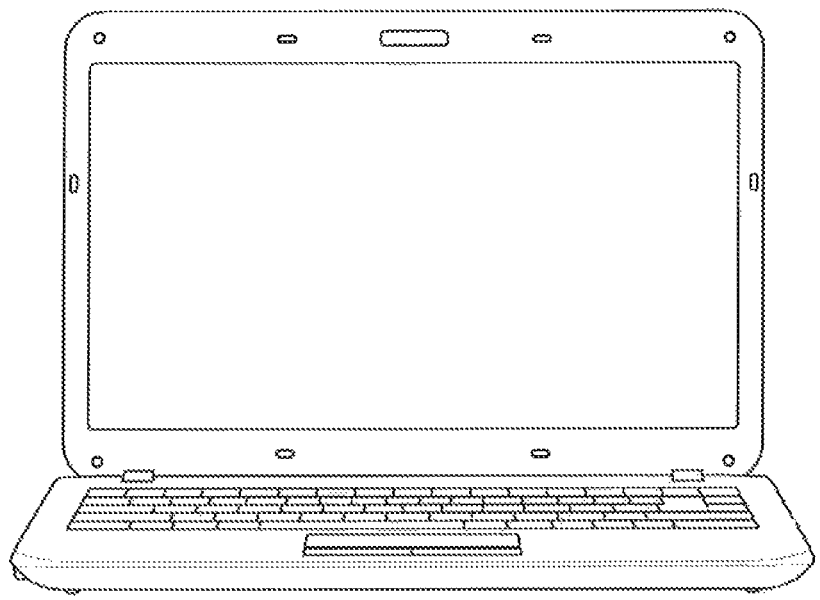
Figure 17:
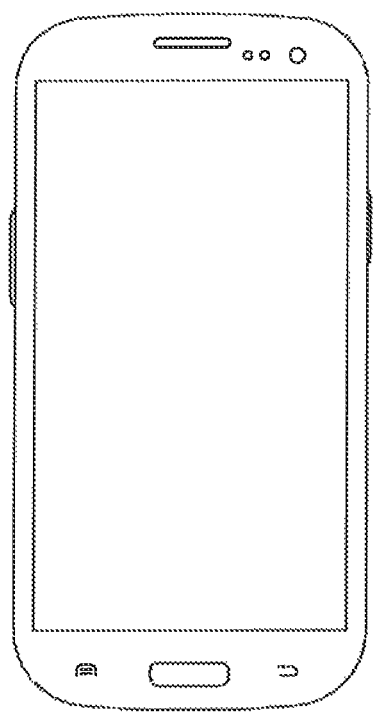

FIGS. 15 to 17 are exemplary semiconductor systems to which the semiconductor device and the method of operating the semiconductor device according to some embodiments of the present inventive concept are applicable.

FIG. 15 is a diagram illustrating a tablet personal computer (PC) 1200, FIG. 16 is a diagram illustrating a laptop computer 1300, and FIG. 17 illustrates a smartphone 1400. The semiconductor device according to various embodiments of the present disclosure may be used within the tablet PC 1200, the laptop computer 1300, or the smartphone 1400. However, the inventive concept is not limited thereto, as the semiconductor device may also be used within various other devices and integrated circuit devices not illustrated.

In some embodiments of the present inventive concept, the semiconductor system may be provided as a computer, as an ultra mobile PC (UMPC), a workstation, a net-book, a personal digital assistants (PDA), a portable computer, a wireless phone, a mobile phone, an e-book reader, a portable multimedia player (PMP), a portable game machine, a navigation device, a black box, a digital camera, a three-dimensional television, a digital audio recorder, a digital audio player, a digital picture recorder, a digital picture player, a digital video recorder, or a digital video player.

While the inventive concept has been particularly illustrated and described with reference to exemplary embodiments thereof, it will be understood by those of ordinary skill in the art that various changes in form and detail may be made therein without departing from the spirit and scope of the present inventive concept.

What is claimed is:

1. A semiconductor device comprising:
   a first channel management circuit in a charge of a communication channel with a first intellectual property (IP) block;
   a second channel management circuit in charge of the communication channel with a second IP block,
   wherein each of the first channel management circuit and the second channel management circuit comprises a running state, a sleep mode entry state, a sleep state and a sleep mode exit state, the first channel management circuit provides a signal to the second channel management circuit only when the first channel management circuit is converted to the sleep state.

2. The semiconductor device of claim 1, the second channel management circuit is not converted into the sleep mode entry state when the first channel management circuit continuously makes a clock request.

3. The semiconductor device of claim 2, the second channel management circuit is converted into the sleep mode entry state when an idle condition for causing the first IP block to enter a sleep mode is satisfied, and the second channel management circuit receives a signal from the first channel management circuit.

4. The semiconductor device of claim 1, when the first channel management circuit in the sleep state satisfies a wakeup condition, the first channel management circuit makes a clock request to the second channel management circuit.

5. The semiconductor device of claim 4, the second channel management circuit is converted into the sleep mode exit state after receiving an acknowledgement of the clock request from the first channel management circuit.

6. The semiconductor device of claim 4, when the clock request is received from the first channel management circuit, the second channel management circuit being in the sleep state is converted into the sleep mode exit state.

7. The semiconductor device of claim 6, the second channel management circuit transmits an acknowledgement to the first channel management circuit.

8. The semiconductor device of claim 1, wherein the first channel management circuit is a master device, and the second channel management circuit is a slave device.

9. The semiconductor device of claim 1, wherein the first IP block is a master device, and the second IP block is a slave device.

10. The semiconductor device of claim 9, wherein the second IP block enters a sleep mode only when the first IP block is already in a sleep mode, and the first IP block wakes up only after the second IP block has woken up.

11. A semiconductor device comprising:
a first intellectual property (IP) block which is provided a communication channel with a clock management unit by a first channel management circuit; and
a second IP block which is provided the communication channel with the clock management unit by a second channel management circuit,
wherein each of the first channel management circuit and the second channel management circuit comprises a running state, a sleep mode entry state, a sleep state and a sleep mode exit state, the first channel management circuit provides a signal to the second channel management circuit only when the first channel management circuit is converted to the sleep state.

12. The semiconductor device of claim 11, the second channel management circuit is not converted into the sleep mode entry state when the first channel management circuit continuously makes a clock request.

13. The semiconductor device of claim 12, the second channel management circuit is converted into the sleep mode entry state when an idle condition for causing the first IP block to enter a sleep mode is satisfied, and the second channel management circuit receives a signal from the first channel management circuit.

14. The semiconductor device of claim 11, when the first channel management circuit in the sleep state satisfies a wakeup condition, the first channel management circuit makes a clock request to the second channel management circuit.

15. The semiconductor device of claim 14, the second channel management circuit is converted into the sleep mode exit state after receiving an acknowledgement of the clock request from the first channel management circuit.

16. The semiconductor device of claim 14, when the clock request is received from the first channel management circuit, the second channel management circuit being in the sleep state is converted into the sleep mode exit state.

17. The semiconductor device of claim 16, the second channel management circuit transmits an acknowledgement to the first channel management circuit.

18. The semiconductor device of claim 11, wherein the first channel management circuit is a master device, and the second channel management circuit is a slave device.

19. The semiconductor device of claim 11, wherein the first IP block is a master device, and the second IP block is a slave device, and the second IP block enters a sleep mode only when the first IP block is already in a sleep mode, and the first IP block wakes up only after the second IP block has woken up.

20. A method for operating a semiconductor device comprising:
entering a master intellectual property (IP) block in a running state to a sleep mode;
converting the master IP block into a sleep state;
providing a signal from a master channel management circuit of the master IP block to a slave channel management circuit of a slave IP block;
entering a slave IP block to the sleep mode; and
converting the slave IP block into a sleep state,
wherein when the master IP block satisfies a wakeup condition and waits for the wake-up of the slave IP block with the QACTIVE value being H, the slave channel management circuit of the slave IP block wakes up based on a clock request received from the master channel management circuit of the master IP block.

* * * * *